(12) United States Patent
Groening

(10) Patent No.: US 6,568,755 B1
(45) Date of Patent: May 27, 2003

(54) CHILD'S SEAT, ESPECIALLY FOR MOBILE USE IN AN AIRCRAFT

(76) Inventor: Manfred Groening, Sierichstrasse 72, 22301 Hamburg (DE)

( * ) Notice: Subject to any disclaimer, the term of this patent is extended or adjusted under 35 U.S.C. 154(b) by 0 days.

(21) Appl. No.: 09/913,913

(22) PCT Filed: Feb. 16, 2000

(86) PCT No.: PCT/DE00/00401
§ 371 (c)(1),
(2), (4) Date: Aug. 17, 2001

(87) PCT Pub. No.: WO00/48862
PCT Pub. Date: Aug. 24, 2000

(30) Foreign Application Priority Data

Feb. 17, 1999  (DE) .......................................... 199 06 547

(51) Int. Cl.[7] ................................................ A47C 1/08
(52) U.S. Cl. ................................ 297/256.13; 297/256.1
(58) Field of Search .......................... 297/250.1, 256.1, 297/256.13, 256.14, 92, 94, 283.1, 283.2, 255, 256, 101, 331, 317, 318, 322

(56) References Cited

U.S. PATENT DOCUMENTS

| | | | | |
|---|---|---|---|---|
| 3,572,827 A | * | 3/1971 | Merelis et al. |
| 4,915,446 A | * | 4/1990 | Darling et al. |
| 5,121,965 A | * | 6/1992 | Skold et al. |
| 5,524,965 A | * | 6/1996 | Barley |
| 5,971,479 A | * | 10/1999 | Jacquemot et al. |
| 6,053,569 A | * | 4/2000 | Flyborg |

* cited by examiner

Primary Examiner—Milton Nelson, Jr.
(74) Attorney, Agent, or Firm—Thomas M. Freiburger

(57) ABSTRACT

A child's seat is especially adapted for mobile use in an aircraft. The seat has a support frame which can be fixed by a belt. A seat pan (9) and a back pan (10) are fixed to the support frame in an articulated manner. The lateral lower ends of the back pan (10) are displaceably accommodated in lateral guiding elements (15) of the support frame. The back pan can be fixed in an upright position by a fixing device and can be displaced in the guiding elements of the support frame once the fixing device has been released. The seat pan can be folded against the back pan and can be made of two pieces. The child's seat can be folded in a compact manner and can be packed in an aircraft in a space-saving manner. The child's seat can especially be used in a conventional passenger set in or against the flying direction.

17 Claims, 11 Drawing Sheets

CHILD'S SEAT, ESPECIALLY FOR MOBILE USE IN AN AIRCRAFT

Figure 1:
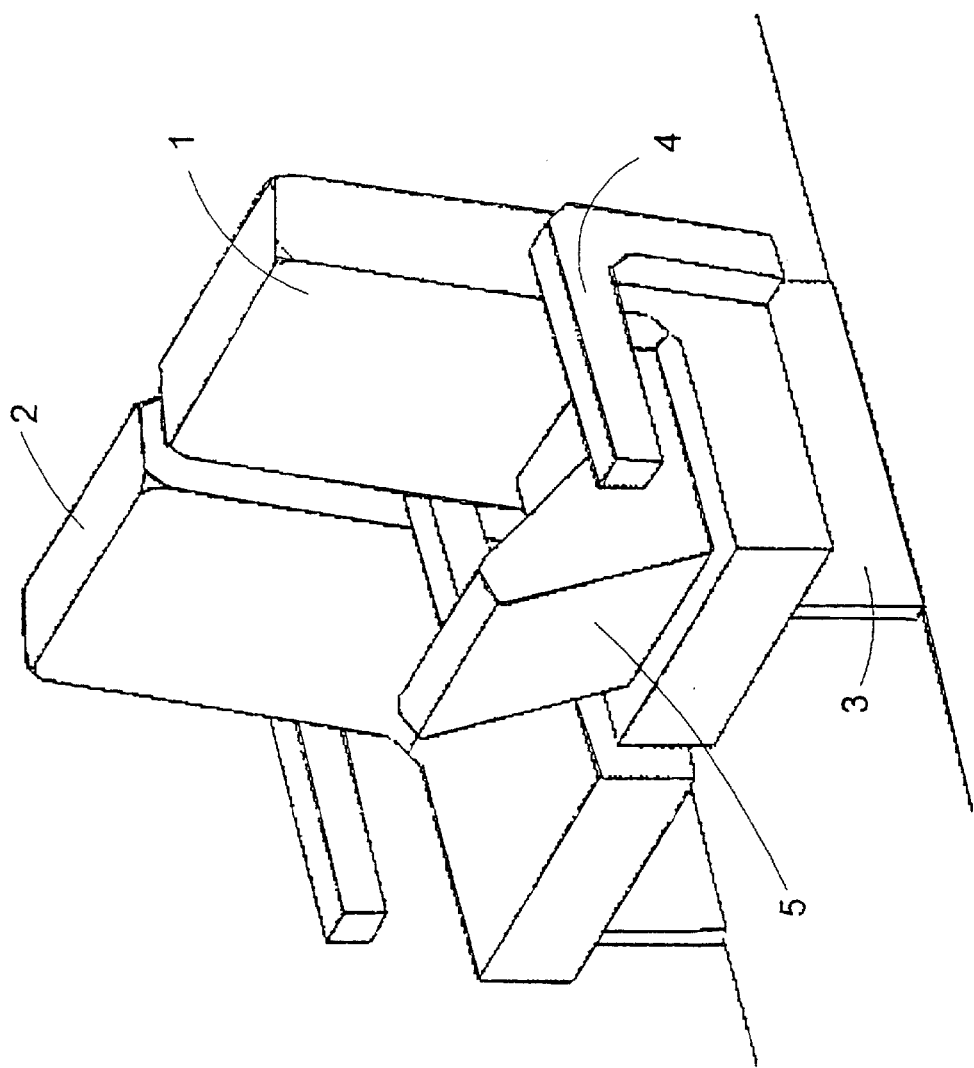

The invention relates to a child's seat, especially for mobile use in an aircraft.

Great attention has been paid in recent decades to the safety of children when transporting them in automobiles. Corresponding legal initiatives have led to the fact that children, especially infants, can today be transported in a child's seat that can considerably reduce the risk of injury to the child in the event of an accident.

As a rule, these types of child seats remain fixed to the vehicle's seat. Seats for infants have in recent years have also frequently been disposed opposite the direction of travel, whereby they can also be fixed to the passenger seat, so that during travel the child can be easily observed by the driver.

On the other hand, when transporting children in commercial aircraft special children's seats are the exception. Basically, is indeed also possible to effix child seats from automobiles to flight passenger seats, however these types of child seats are as a rule not suited for this purpose for reasons of size and because of their weight. Furthermore, they seldom meet the safety requirements of the flight safety institutions.

Known from EP 0526719 A1 is a contrivance for construction of child seats where a child's seat is affixed to the backside of a partition of the flight passenger cabin. The disadvantage of such a system lies especially in the fact that the arrangement is permanently installed and requires considerable space.

Known from DE-GM 9202597.8 is a foldable child's seat that can be fixed on a regular passenger seat with the usually available belts. Folding the child's seat is done with a relatively complex lever rod. A child's seat of this type is fixed in the devotion of flight. However, since for safety reasons it is desired, for infants, to arrange child seats opposite to the direction of flight, the known child's seat is not suited for this.

The object of the invention is to furnish a child's seat, especially for mobile use in an aircraft, that can be fixed on a passenger seat selectably in the direction of or opposed to travel, that can be easily folded into a compact unit, that is light in weight, can be easily stored in the aircraft, and that is suitable for smaller as well as bigger children. This objective is satisfied by the invention given in Claim 1. Advantageous further developments of the invention are given in the subclaims.

Starting from a child's seat with a support frame that can be fixed on a vehicle or aircraft passenger seat by means of a belt, to which are fixed in articulated fashion a seat pan and a back pan, and the support frame having a locking means for adjusting the child seat in a particular sitting position, the invention is characterized by the fact that the lateral lower ends of the back pan are displacebly supported in lateral guide of the support frame, that the back pan is fixable (lockable) in an upright position relative to the support frame with the aid of the locking means, whereby, after release of the locking means, the back pan can be displaced in the guides of the support frame, and that the seat pan that is fixed in articulated fashion at the lower end of the back pan can be folded against the back pan.

Hence, the child's seat in accordance with the invention is foldable as well as displaceable in the support frame. Obtained in this manner after folding is a compact unit that can accordingly be accommodated in space-saving manner in the aircraft. The support frame forms not only the base for the back and seat paths but also the basic structure of the child's seat with which the seat is fixed on the aircraft seat. Besides, the support frame forms a covering for the seat cushion when stowing the seat.

Preferably, the support frame is of U-shaped cross section and displays laterally projecting arms in which are formed the guides in which the back pan is displaceable. The guides are, in particular, constructed as slot-like cutouts of the lateral arms of the support frame, which run parallel to the floor surface of the support frame. Therewith, the back pan can be almost completely pushed into the support frame, and after the seat pan is folded onto the cushion of the back pan there results the proposed compact unit.

To simplify handling, the lower ends of the back pan are preferably guided through a roller bearing into the slot-like cutouts of the support frame.

In another embodiment of the invention, the locking means, in the locked position of the back pan, engage in at least one of the lateral arms of the support frame, whereby the engagement position of the locking means is disposed at some distance from the bearing location of the back pan in the support frame.

By this measure, obtained for the back pan are two fixing points; namely support of the lower end of the back pan in the lateral guides and, further, a locking means in each case arranged at some distance therefrom, which in another embodiment of the invention is also fixable in different positions. After release of the locking means, the back pan can be moved along the roller bearing-means in the support frame.

The locking means is preferably constructed as a lever-arm-actuated, spring-loaded stop pin that engages into a stop cutout of a lateral arm of the support frame. Advantageously disposed on either side of the seat is a stop pin, which can be actuated at the same time by a lever management.

The stop pin can assume the lock function, and at the same time take over a guidance function if the step pin displays an axial region of large diameter for engagement into the stop cutout of a lateral arm of the support frame, as well as an axial region of smaller diameter that is displaceable in the guide slot of the lateral arm of the support frame, whereby the width of the guide slot is narrower than the diameter of the stop cutout, and the stop cutout and the guide slot fade into each other. Therefore, if the stop pin with its larger diameter is pressed out of the stop cutout, the stop function is released and the back pan can be pushed against the support frame. However, since the stop pin remains with its smaller diameter in the guide slot adjoining the stop cutout, the back pan can move only in accordance with the configuration of the guide slot in conjunction with the guidance through the roller bearing-means, so that the movement of the back pan relative to the support frame is forcefully executed. If several stop positions with stop cutouts are provided along the guide slot, the stop pin can engage with its larger diameter in any whatever stop positions, in each case in the stop cutout, so that different fixed positions of the back pan can be achieved. In particular, stop cutouts are in any case provided at both ends of the guide slot, so that the back pan, in the first position of the stop pin assumes the normal position of use at the back end of the guide slot, and in the second position at the forward end of the guide slot assumes the fully pushed in position in the support frame, in which the child's seat is transportable and can be stowed in a compact fashion. Advantageously, the guide slot and the guiding means in the lateral arms run essentially parallel to one another and to the plane of the floor plate of the support frame. Hence, the child's seat can be pushed into the support frame in drawer fashion.

The seat pan, relative to the back pan, is preferably adjustable in locking fashion, whereby by means of several locking positions different seating angles between back pan and seat pan can be obtained.

In order to be able to use the child's seat for somewhat bigger children, the seat pan is advantageously constructed in two pieces, whereby disposed in an articulated manner at the lower end of the back pan is a seat part, and at the front end of the seat part a support part. The linkage between seat part and support that is, in particular, adjustable in several stop positions, so that the child's shins and feet can assume a comfortable position. In the case of bigger children, it has been established to fix the child's seat in the flight direction, while for small children an arrangement in the direction opposite to flight is preferred.

In another embodiment of the invention, provision can be made to arrange a panel on the front edge or also at a side edge and joined in an articulated manner with the seat pan, the panel being usable as a play table for small children. This panel in the folded condition of the child's seat can run in the direction of the seat pan, without it taking up additional space when stowing the child's seat.

Securing the child in the child's seat is preferably done by means of a 5-point belt.

Figure 2:
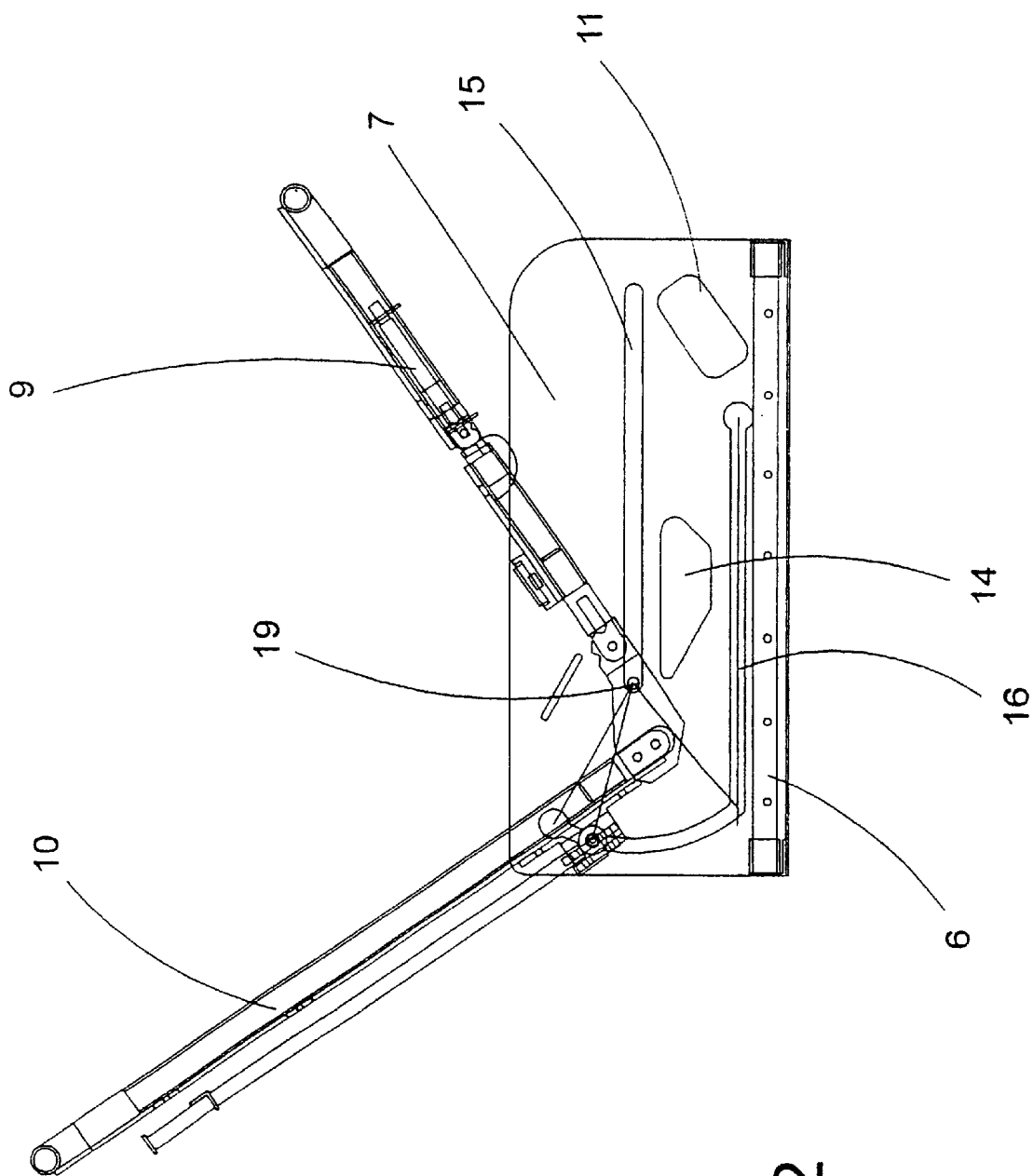
Figure 3:
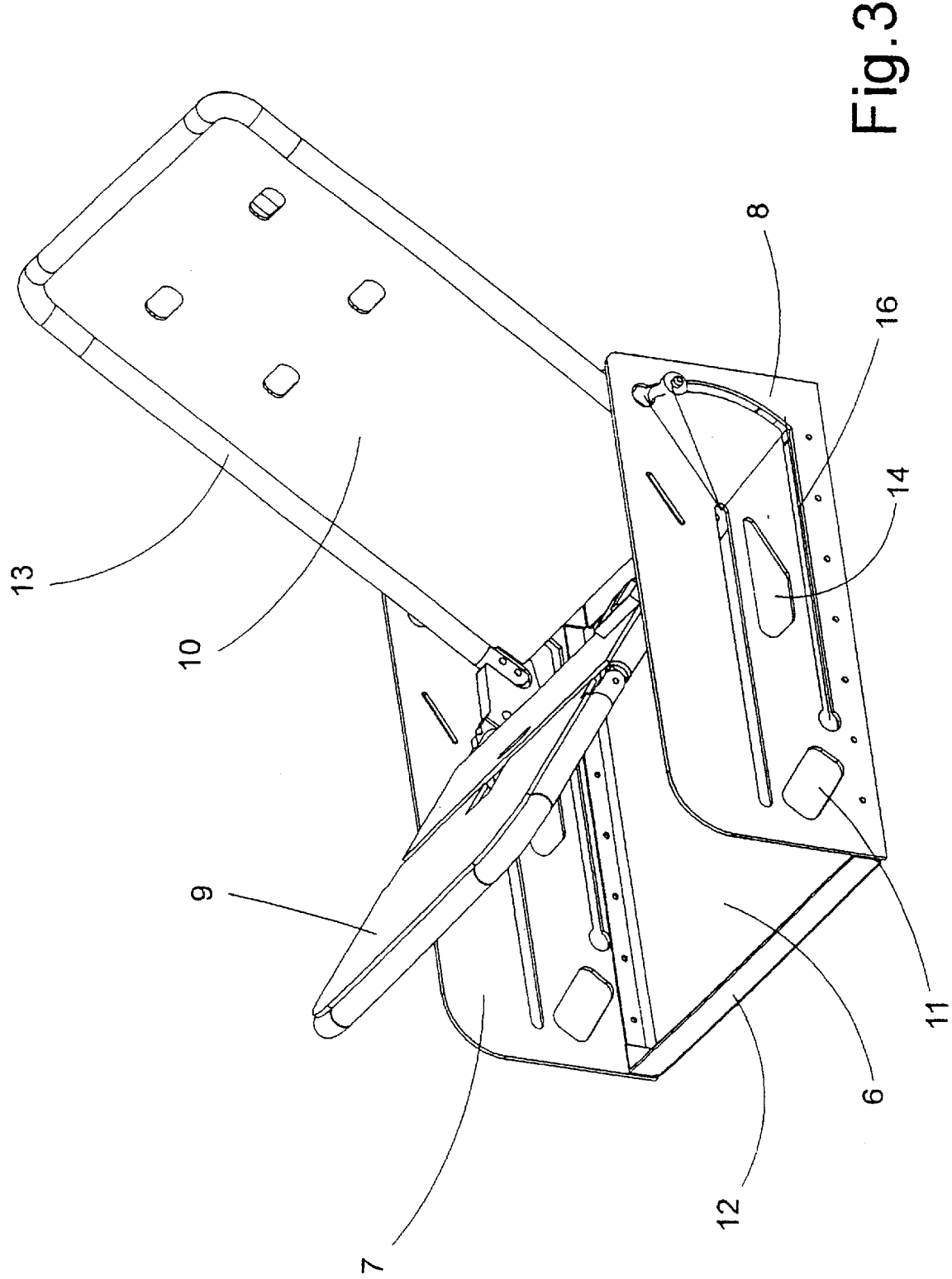
Figure 4:
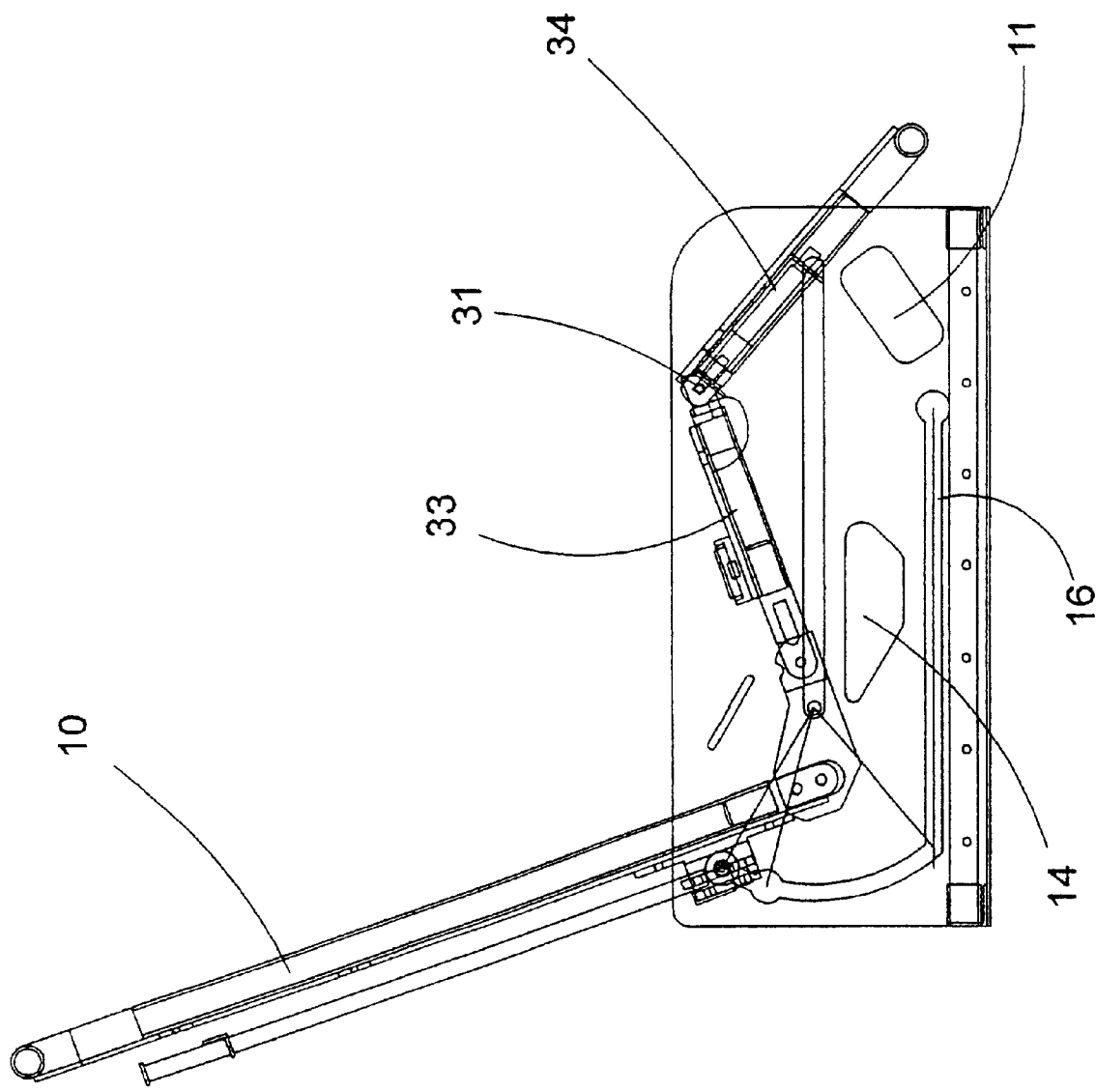
Figure 5:
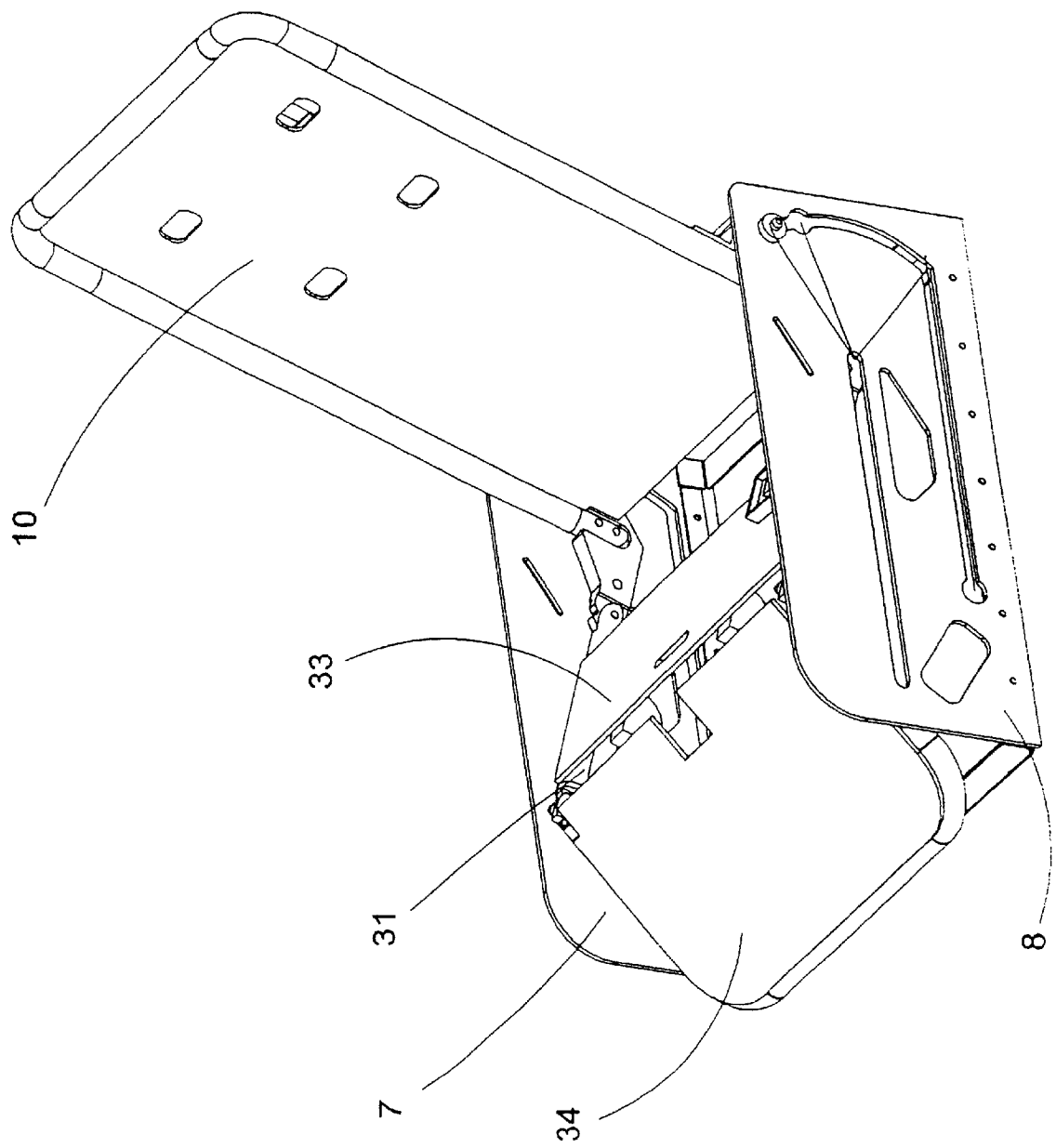
Figure 6:
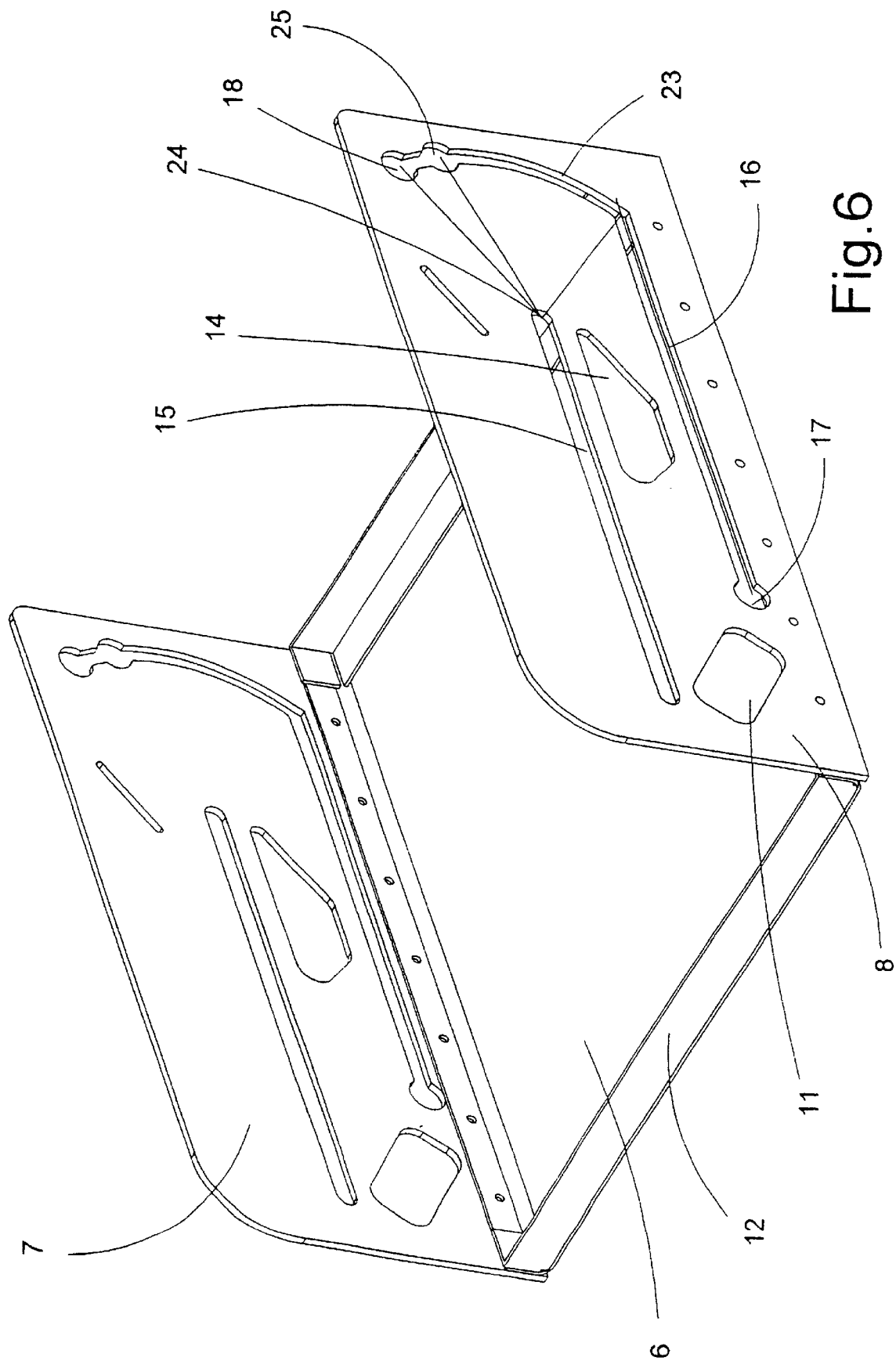
Figure 7:
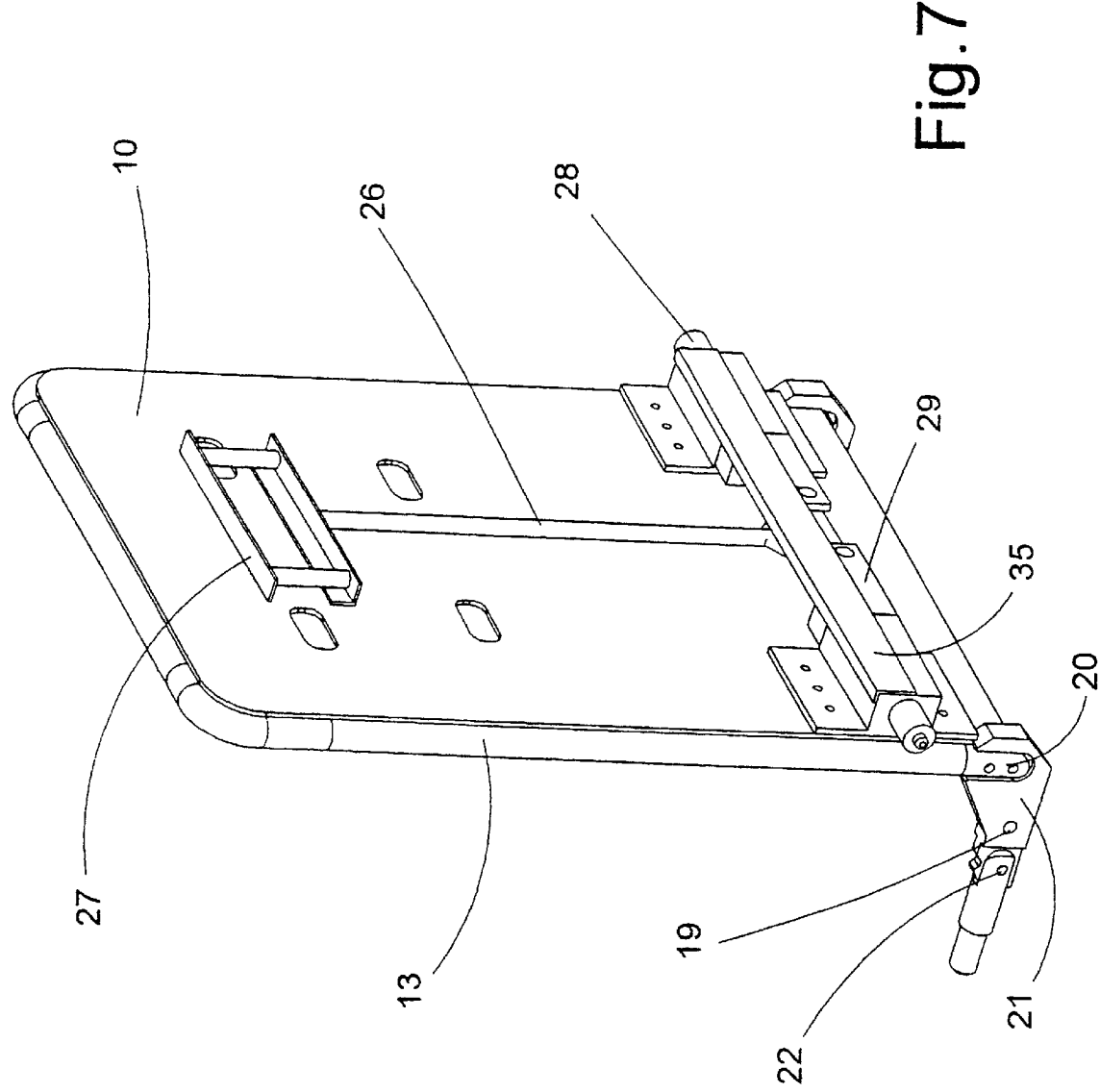
Figure 8:
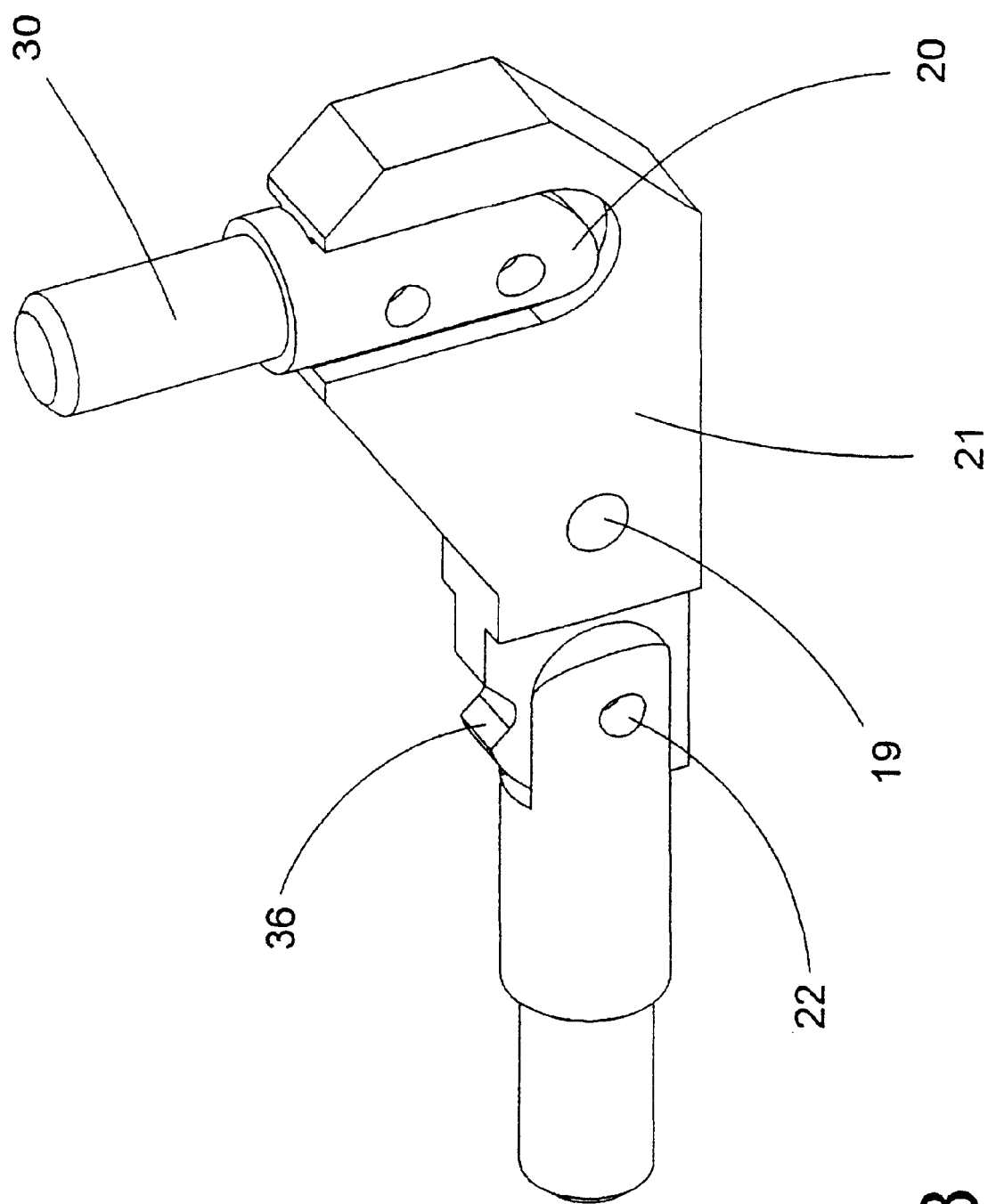
Figure 9:
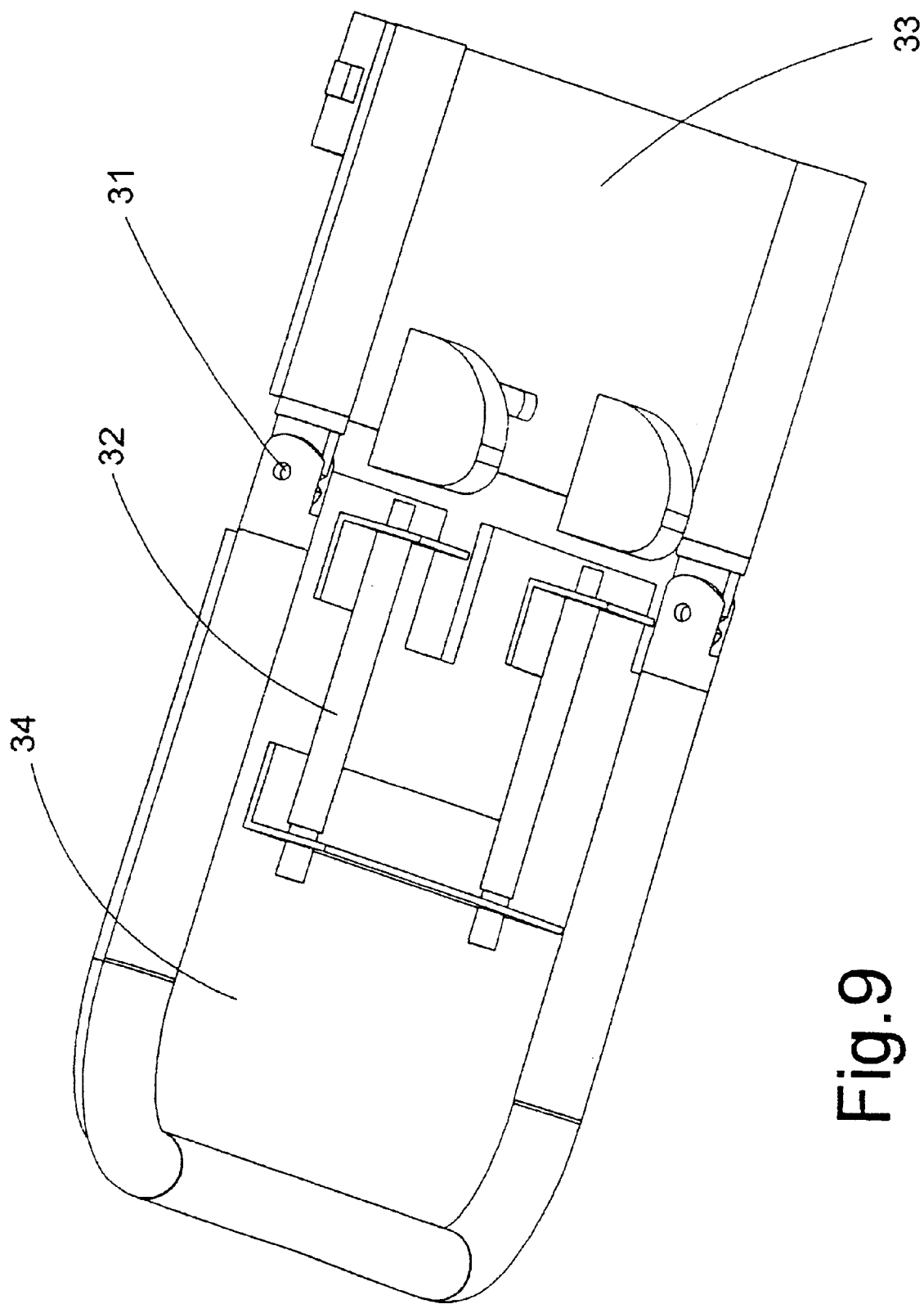
Figure 10:
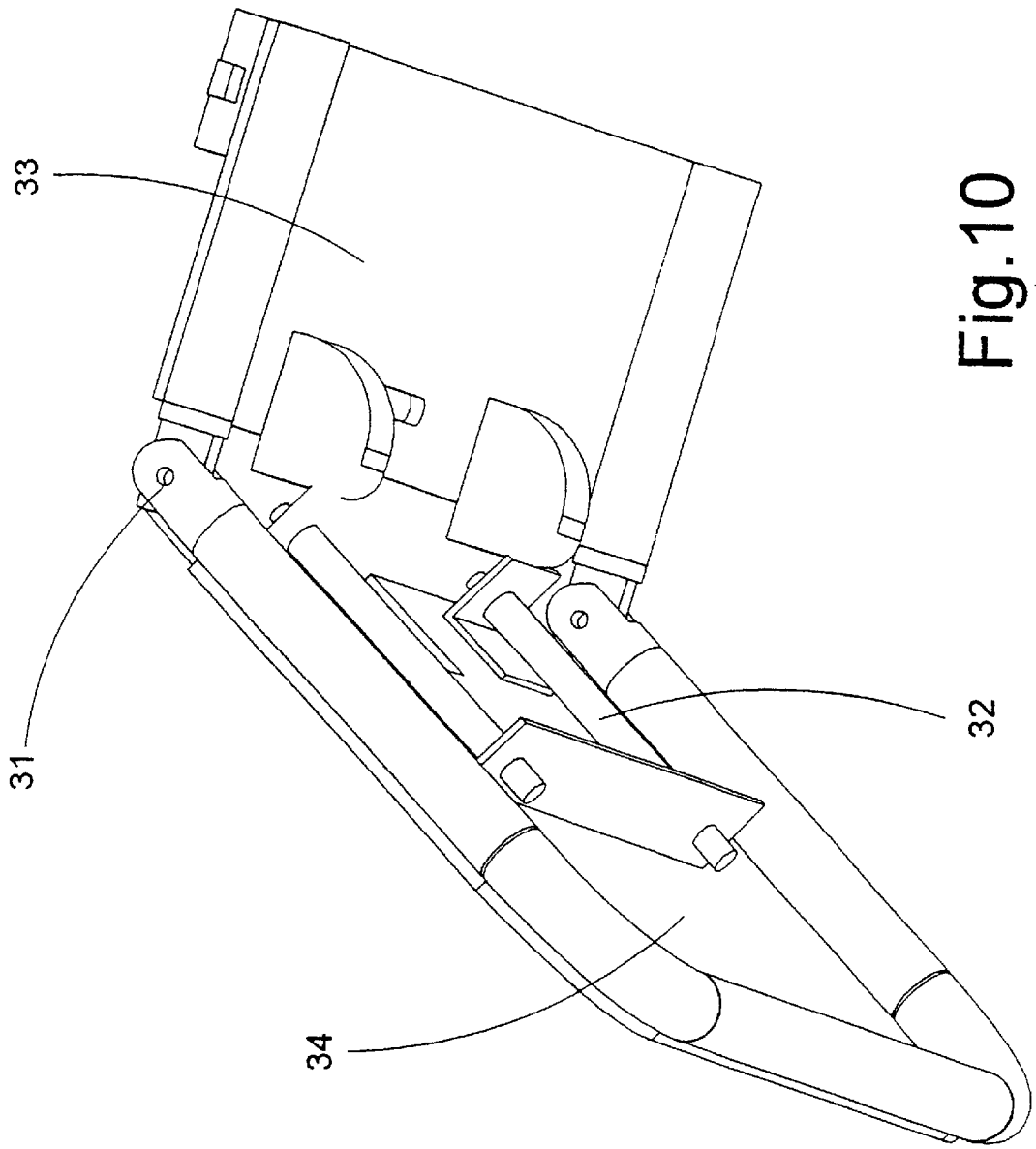
Figure 11:
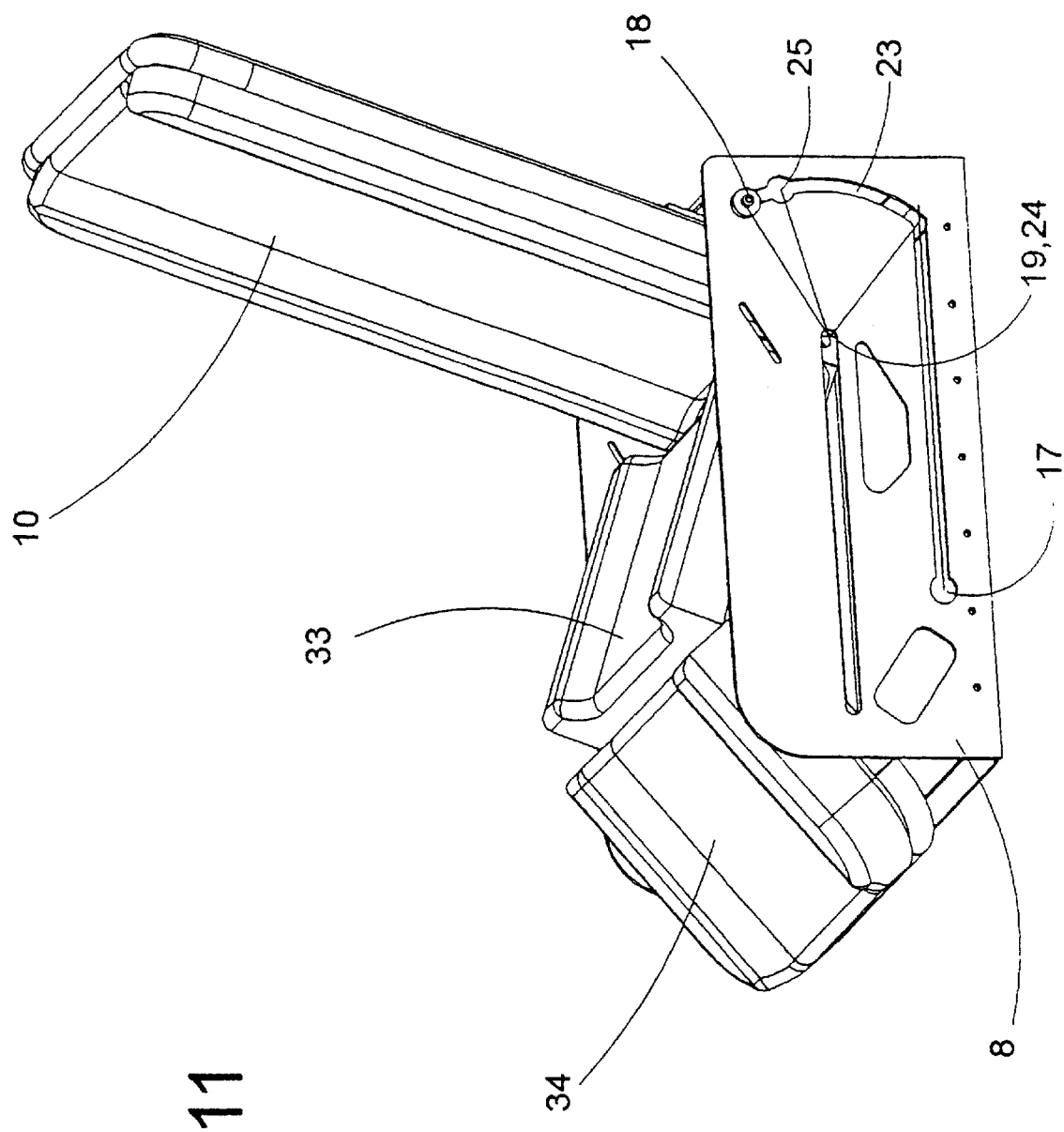

The invention will be described in more detail in the following with an example of embodiment. Shown are:

FIG. 1 a basic principle of the arrangement of a child's seat in accordance with the invention, FIG. 2 a child's seat with flat seat pan, in a side view, FIG. 3 a child's seat based on FIG. 2, in a perspective view, FIG. 4 a child's seat with an angled seat, in a side view, FIG. 5 a child's seat based on FIG. 4, in a perspective view, FIG. 6 a support frame, in a perspective view, FIG. 7 the rear side of a back pan, FIG. 8 brace between back pan and seat pan, FIG. 9 a split seat pan in the flat position, FIG. 10 a split seat pan in the angled position, FIG. 11 a child's seat with cushions installed.

Represented in FIG. 1 are two flight passenger seats 1, 2 that are fixed to the cabin floor of the aircraft by means of floor rails 3. The seats each display lateral arm rests 4, whereby a child's seat 5 is fixed on seat 1 between the rests 4 by means of conventional seat belts. The figure shows that the child's seat is disposed in the direction opposite to flight, which guarantees a high degree of safety, especially for small children.

FIGS. 2 and 3 show a child's seat with a flat seat pan in a side view. Provided is a support frame with a floor plate 6 and two projecting side arms 7, 8, whereby the support frame can be placed directly on the cushion of a passenger seat. A frame 12 surrounds the floor plate 6. In some cases, the frame 12 can also be used without floor plate 6. Fixing the child's seat on the aircraft seat is done with the passenger seat belt, which can be guided through the belt feedthrough 11 in the side arms 7, 8. To avoid damaging the belt and its edges when guiding it through the belt feedthrough 11, the arms of the belt feedthrough 11 can display rounded reinforcements. Furthermore, the belt can be guided through via a spring of cushioned turnback in order to maintain the belt constantly under tension, so that movement of the child's seat on the passenger seat is to a great extend prevented.

In the representation shown in FIGS. 2 and 3, the child's seat is fixed on the passenger seat opposed to the flight direction. Therefore, the passenger belt is guided through the belt feedthroughs. If the child's seat is placed on the passenger seat in the flight direction, used are the belt feedthroughs 14 in the lateral arms 7, 8, which are constructed correspondingly to the belt feedthroughs 11.

The back pan 10 is fixed at the back end of the support frame, while a brace attached to the lower ends of the back pan 10 is fixed via lateral hinges 19 to the lateral arms 7, 8 of the support frame. The hinges are constructed as roller bearings and can be moved forward and back in the guide 15 means of the lateral arms 7, 8.

The seat pan 9 is fixed in an articulated manner at the lower end of the back pan 10. Both the back pan 10 and the seat pan 9 are each formed by a tube frame 13, into which is placed an anatomically, precisely-constructed seat and/or back pan made of plastic or textile material.

FIGS. 4 and 5 show a child's seat with angled seat pan that is placed in this position on a passenger seat, in the direction of flight. The seat pan 9 is formed by a seat part 33 and a support part 34 that are joined together via a hinge. By this means, a bigger child can take this place more comfortably in the child'seat. By arrangement in the flight direction and the angled position of the seat pan 9, the space requirement for the child and the child'seat is less than in the case of a set up in accordance with FIGS. 2 and 3.

FIG. 6 shows a support frame a perspective view. Fixed to the frame 12 are two lateral arms 7, 8 that each contain two parallel, essentially horizontally-running slots. The upper slot is constructed as a guide means 15 that accommodates the joint 19 (see FIGS. 2 and 4). The lower slot is constructed as a guide slot 16 and displays at both its ends stop cutouts 17, 18. Here, the stop cutout 18 is situated at the upper edge of an arc 23, which is guided in the vertical direction in the arc from the rear end of the straight part of the guide slot 16. Further provided in the arc section 23 is a second stop position 25 for setting the back pan at another angle. The upper stop position 18 serves for setting back pan 10 when using the child's seat with an angled seat pan, while the stop position 25 finds use in the case of construction of the child's seat with a straight seat pan 9.

FIG. 7 shows the rear side of the back pan 10. The rear side displays central, upwardly-directed rod 26 at whose top end is located an operating handle 27. The lower end of the rod 26 is joined with a converting means 29 that enables one upward vertical movement of the rod 26 to be converted into two horizontal movements of a pin holder 35. The pin holder displays at its outer ends two stop pins 28 on which the guides 16 or arc 23 engage. The stop pins display a first region of large diameter that can engage in an appropriate manner into the circular shaped cutouts 18, 25 and 17.

The arc 23, which displays a smaller width than the diameter of the stop cutout 18, terminates at the stop cutout 18. Since the stop pin displays a second region with a diameter that is slightly smaller than the free width of the guide slot 16 or the arc 23, the region with the smaller diameter of the stop pin, as soon as the region with the greater diameter of the stop pin has been pushed out of the stop cutout 18, can be slidingly guided in the arc 23 and/or guide slot 16. While at the upper end of the arc 23 the stop cutout 18 and/or the stop cutout 25 serves to lock the use position of the back pan 10, the stop cutout 17 at the forward end of the guide slot 16 serves for securing the back pan 10 in the support frame in its end position, in the pushed-in position.

FIG. 7 also shows that the lower end 20 of the back pan 10 is joined with a brace that contains the link 19 located at the free end of the brace 21 is the link 22 that forms the articulated connection with the seat pan 9.

FIG. 8 shows the brace 21 again, in an enlarged representation. The lower end 20 of the back pan 10 is fixed in the tube frame 13 of the back pan by means of an socket pin 30. The seat pan can be folded relative to the back pan by means of the link 22. To reach a locking position between back pan and seat pan, link 22 is provided with a stop notch 36.

As soon as the stop pin 28 at the lower end of the back pan 10 is released out of the stop cutouts 18 or 25 via the rod 26 by means of the operating handle 27, the region of the stop pin with the smaller diameter can slide downwardly in the arc 23 so that back pan 10 together with the seat pan 9 can be brought into a position running parallel to the floor plate. Since the guide slot 16 and the guide means 15 run parallel to the floor plate 6 in the longitudinal direction of the side arm 8 after reaching the horizontal position of the back pan 10, the unit formed of back pan 10 and seat pan 9 can be pushed to the forward end of the support frame, whereby the bearing 19 slides in the guide means 15, while the stop pin with its smaller diameter slides in the guide slot 16, until the stop pin has reached the stop cutout 17, in which the stop pin engages with its greater diameter in the stop cutout 17, so that there again results a lockable position.

The seat pan can then be folded onto the reclining back pan via the link 22, so that there results overall a very compact unit that can be slowed in a space-saving manner.

The guide means 15, the guide slot 16 and the arc 23 are formed as cutouts or stamping of the lateral arms 7 or 8 of the support frame and are, for example, produced from an aluminum plate by water jet milling. Since the arc 23, which runs between the stop cutout 18 and straight part of the guide slot 16 is constructed corresponding to a section of the circumference of a circle with the center point at the point of rotation 24 on which is situated the link 19 in the position of use, the back pan 10, with release of the stop pin out of the stop cutout, can fold down without the link 19 first moving away from the point of rotation 24. It is only when the back pan is completely folded down that the stop in can be pushed with its smaller diameter parallel to the guide means 15.

The invention hereby covers the other patterns of the guide slot 16. In particular, provision can also be made to arrange additional stop cutouts along the arc 23 so that the back pan can be locked in a series of positions.

Guide slot 16 and/or guide means 15 can also be formed by the rails fixed to the support frame, wherewith the formation of a slot in the arms of the support frame can be avoided. This increases the strength of the support frame.

FIG. 9 shows a seat pan 9 in a flat position. The seat part 33 and the support part 34 are joined with one another by means of a link 31. Located below the support part 34 is a stop rod 32 that serves for adjusting the support part 34 relative to the seat part 33.

FIG. 10 shows the seat part in an angled view, whereby the seat part 33 and the support part 34 are arranged at an angle to one another. The angular position can be set in two or more positions, for example through means of a ball catch in the link 31. However, fixed stop positions can also be set by the stop rod 32.

Finally, FIG. 11 shows the child's seat with angled seat pan, whereby the figure clearly shows the arrangement of the cushion in the seat pan and in the back pan.

The child's seat according to the invention is universally applicable. For small children, especially suited is the construction of the child's seat with a flat arrangement, whereby the child's seat is fixed on a passenger seat in the direction opposed to flight.

For bigger children, the arrangement of the child's seat in the flight direction is suitable, whereby the seat pan is angled. Obtained therewith is a particularly comfortable position for the child and the arrangement has the advantage of the space requirement on the passenger seat being considerably less than in the position of the child's seat in the direction opposite to flight.

Basically, the child's seat in accordance with the invention can also be used in other vehicles, such as e.g., trucks, buses and the like.

Reference Numbers List 1 (Flight) passenger seat
2 (Flight) passenger seat
3 Floor rail
4 Side arm (arm rest)
5 Child's seat
6 Floor plate
7 Lateral arm
8 Lateral arm
9 Seat pan
10 Back pan
11 Belt feedthrough
12 Frame
13 Tube frame
14 Belt feedthrough
15 Belt feedthrough
16 Guide slot
17 Stop cutout
18 Stop cutout
19 Link
20 Lower end
21 Brace
22 Link
23 Arc
24 Pivot point
25 Stop cutout, stop position
26 Rods
27 Operating handle
28 Stop pin
29 Converting means
30 Plug-in pin
31 Link
32 Stop rod
33 Seal part
34 Support part
35 Pin holder
36 Stop notch

What is claimed is:

1. Child's seat, in particular for mobile use in an aircraft, with a support frame capable of being fixed by means of a belt on a drive or passenger seat (1,2), on which are fixed in articulated manner a seat pan (9) and a back pan (10), whereby associated to the support frame is a locking means for adjusting the child's seat in a given seating position, characterized by the lateral lower ends of the back pan (11) are displaceably supported in lateral guide means (15) of the support frame, that the back pan (10) can be fixed in an upright position relative to the support frame with the aid of the locking means, whereby after release of the locking means the back pan (10) is displaceable in the guide means (15) of the support frame, and the seat pan (9) linked at the lower end of back pan (10) can be folded against the back pan (10).

2. Child's seat according to claim 1, wherein the support frame is constructed with a U-Shaped cross section with laterally projecting arms (7, 8) and that the guide means (15) run in the lateral arms (7, 8).

3. Child's seat according to claim 2 wherein the guide means (15) are formed by slot-shaped cutouts of the lateral arms (7, 8) of the support frame, running parallel to a floor surface (6) of the support frame.

4. Child's seat according to claim 3, wherein the lower ends of the back pan (10) are guided in the slot-shaped guide means (15) by a roller bearing (19).

5. Child's seat according to claim 2, wherein a bearing (19) connecting the back pan (9) in the support frame, and that the locking means of the back pan (10) is constructed such that, in the locked position of the back pan (10), it engages in a stop cutout (18) in at least one of the lateral arms (7, 8) of the support frame, whereby the position of engagement of the locking means is disposed at a distance from the bearing (19) of the back pan (10) in the support frame.

6. Child's seat according to claim 5, wherein the locking means is constructed as a spring loaded stop pin capable of being actuated by means of a lever arm that engages in a stop cutout (17, 18) defining an engagement position of a lateral arm of the support frame.

7. Child's seat according to claim 6, wherein the stop pin displays an axial region of large diameter for engaging in a stop cutout (17, 18) of the lateral arm (7, 8) of the support frame, and an axial region of smaller diameter that is displaceable in a guide slot (16) of a lateral arm of the support frame, whereby the width of the guide slot (16) is narrower than the diameter of the stop circuit (17, 18), and that the stop cutout (17, 18) and the guide slot (16) blend into one another.

8. Child's seat according to claim 7, wherein the guide slot (16) and the guide means (15) run, over a partial section, essentially parallel to each other and to a floor plate (6).

9. Child's seat according to claim 5 or 6, wherein the support frame displays several engagement positions (17, 18) of the locking means.

10. Child's seat according to claim 9, wherein the guide slot (16) displays, at least at both its ends, a stop cutout (17, 18).

11. Child's seat according to claim 1, wherein characterized by the seat pan (9) is adjustably lockable relative to the back pan (10).

12. Child's seat according to claim 11, wherein characterized by arranged on the front or lateral edge of the seat pan (9) is a panel joined in articulated manner with the seat pan (9).

13. Child's seat according to claim 12 wherein characterized by in the folded condition of the child's seat support frame, the back pan (10), seat pan (9) and the panel run essentially parallel to each other.

14. Child's seat according to claim 1, wherein a five-point belt is provided for securing the child placed in the child's seat.

15. Child's seat, in particular for mobile use in an aircraft, with a support frame capable of being fixed by means of a belt on a driver or passenger seat (1,2), on which are fixed in articulated manner a seat pan (9) and a back pan (10), whereby associated to the support frame is a locking means for adjusting the child's seat in a given seating position, characterized by the lateral lower ends of the back pan (11) are displaceably supported in lateral guide means (15) of the support frame, that the back pan (10) can be fixed in an upright position relative to the support frame with the aid of the locking means, whereby after release of the locking means the back pen (10) is displaceable in the guide means (15) of the support frame, and the seat pan (9) linked at the lower end of back pan (10) can be folded against the back pan (10), the seat pan being constructed in two pieces, whereby a seat part (33) is linked to the lower end of the back pan and a support part is fixed at the free front edge of the seat part (33).

16. Child's seat according to claim 15, wherein the link (31) between seat part (33) and the support part (34) can be set in at least two positions.

17. Child's seat according to claim 11, wherein provided between seat part (33) and support part (34) is a stop contrivance for setting the angle between the seat part and the support part.

\* \* \* \* \*